US011774615B2

(12) United States Patent
Liu et al.

(10) Patent No.: US 11,774,615 B2
(45) Date of Patent: Oct. 3, 2023

(54) METHOD AND SYSTEMS FOR COMPUTATIONAL EFFICIENCY 3D PRESTACK KIRCHHOFF DEPTH MIGRATION

(71) Applicant: SAUDI ARABIAN OIL COMPANY, Dhahran (SA)

(72) Inventors: Hongwei Liu, Dhahran (SA); Yi Luo, Dhahran (SA); Yujin Liu, Beijing (CN); Song Han, Beijing (CN); Yue Du, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 119 days.

(21) Appl. No.: 17/643,500

(22) Filed: Dec. 9, 2021

(65) Prior Publication Data
US 2023/0184976 A1    Jun. 15, 2023

(51) Int. Cl.
*G01V 1/30* (2006.01)
*G01V 1/28* (2006.01)
*G01V 1/34* (2006.01)

(52) U.S. Cl.
CPC .............. *G01V 1/302* (2013.01); *G01V 1/282* (2013.01); *G01V 1/305* (2013.01); *G01V 1/345* (2013.01); *G01V 2210/51* (2013.01)

(58) Field of Classification Search
CPC ........ G01V 1/302; G01V 1/282; G01V 1/305; G01V 1/345; G01V 2210/51
See application file for complete search history.

(56) References Cited

U.S. PATENT DOCUMENTS

| 2004/0054477 A1* | 3/2004 | Bernitsas | G01V 1/20 |
| | | | 702/14 |
| 2005/0237857 A1* | 10/2005 | Jiao | G01V 1/28 |
| | | | 367/69 |

(Continued)

FOREIGN PATENT DOCUMENTS

| CN | 103926619 B | 12/2014 |
| CN | 110031898 A | 7/2019 |

OTHER PUBLICATIONS

Gijs J.O. Vermeer "Processing orthogonal geometry—what is missing?" 75th Annual International Meeting, SEG, Expanded Abstracts; 2005 (4 pages).

(Continued)

*Primary Examiner* — Mischita L Henson
(74) *Attorney, Agent, or Firm* — Osha Bergman Watanabe & Burton LLP

(57) ABSTRACT

Methods and systems for forming a three-dimensional ("3D") seismic image of a subterranean region of interest is disclosed. The method includes obtaining a seismic dataset a seismic trace for each of a plurality of pairs of one source and one receiver location and obtaining a 3D travel-time cube for each source location and each receiver location. The method further includes dividing the seismic dataset into a plurality of seismic subsets composed of set of source locations, set of receiver locations a seismic trace for each pair of source and receiver location and the 3D travel-time cube for each source for each receiver location. The method still further includes transmitting, to a random-access memory block of a computer processing unit the seismic subset, and forming a seismic partial image based on the seismic subset, and determining the 3D seismic image based on a combination of the seismic partial images.

20 Claims, 8 Drawing Sheets

(56) References Cited

U.S. PATENT DOCUMENTS

2017/0059729 A1    3/2017  Eick et al.
2017/0068008 A1*   3/2017  Colombo ............... G01V 1/362
2019/0154857 A1    5/2019  Wang et al.

OTHER PUBLICATIONS

Stewart Trickett "Cleaning up first arrivals in the cross-spread domain" 89th Annual International Meeting, SEG, Expanded Abstracts; 2019 (5 pages).

D. Teixeira et al. "Implementation of Kirchhoff prestack depth migration on GPU" 83rd Annual International Meeting, SEG, Expanded Abstracts; 2013 (4 pages).

C. Tzimeas "Image Resolution Analysis: A New, Robust Approach To Seismic Survey Design" Ph. D Thesis, Texas A&M University; May 2004 (191 pages).

Gijs J.O. Vermeer "3-D seismic survey design, Chapter 2: 3-D symmetric sampling" Society of Exploration Geophysicists; 2002 (32 pages).

C. Li et al. "High Performance Kirchhoff Pre-Stack Depth Migration on Hadoop" Society for Modeling & Simulation International; 2015 (8 pages).

* cited by examiner

METHOD AND SYSTEMS FOR COMPUTATIONAL EFFICIENCY 3D PRESTACK KIRCHHOFF DEPTH MIGRATION

BACKGROUND

Seismic surveys are frequently conducted by participants in the oil and gas industry. Seismic surveys are conducted over subterranean regions of interest during the search for, and characterization of, hydrocarbon reservoirs. In seismic surveys, a seismic source generates seismic waves which propagate through the subterranean region of interest are and detected by seismic receivers. Typically, both seismic sources and seismic receivers are located on the earth's surface. The seismic receivers detect and store a time-series of samples of earth motion caused by the seismic waves. This time series may be termed a "trace" or a "seismic trace". The collection of time-series of samples recorded at many receiver locations generated by a seismic source at many seismic source locations constitute a seismic data set.

To determine earth structure, including the presence of hydrocarbons, the seismic data set may be processed. Processing a seismic data set includes a sequence of steps designed to correct for near-surface effects, attenuate noise, compensate of irregularities in the seismic survey geometry, calculate a seismic velocity model, image reflectors in the subterranean, calculate a plurality of seismic attributes to characterize the subterranean region of interest, and aid in decisions governing if, and where, to drill for hydrocarbons.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method forming a three-dimensional ("3D") seismic image of a subterranean region of interest. This method includes, obtaining a seismic dataset for the subterranean region of interest, wherein the seismic dataset comprises a plurality of source locations, a plurality of receiver locations, and a seismic trace for each pair of one source location and one receiver location. This method further includes obtaining a 3D travel-time cube for each source location and each receiver location, dividing the seismic dataset into a plurality of seismic subsets, each subset comprising: a first set of source locations; a second set of receiver locations; the seismic trace for each pair of one source location from the first set and one receiver location from the second set; and the 3D travel-time cube for each source in the first set and 3D travel-time cube for each source in the second set, wherein a first size of the first set and a second size of the second set differ by less than fifty percent of a sum of the first size and the second size; for each seismic subset, transmitting, to a random-access memory block of a computer processing unit ("CPU"), the seismic subset, and forming, using the CPU, a seismic partial image based, at least in part, on the seismic subset, and determining the 3D seismic image based, at least in part, on a combination of the seismic partial image for each seismic subset.

In general, in one aspect, embodiments relate to a non-transitory computer readable medium storing instructions executable by a computer processor, the instructions including functionality for receiving a seismic dataset for a subterranean region of interest, wherein the seismic dataset comprises a plurality of source locations, a plurality of receiver locations, and a seismic trace for each pair of one source location and one receiver location, receiving a 3D travel-time cube for each source location and each receiver location, dividing the seismic dataset into a plurality of seismic subsets, each subset comprising: a first set of source locations; a second set of receiver locations; the seismic trace for each pair of one source location from the first set and one receiver location from the second set; and the 3D travel-time cube for each source in the first set and 3D travel-time cube for each source in the second set, wherein a first size of the first set and a second size of the second set differ by less than fifty percent of an average of the first size and the second size; for each seismic subset; transmitting, to a random-access memory block of a computer processing unit ("CPU"), the seismic subset; and forming, using the CPU, a seismic partial image based, at least in part, on the seismic subset, and determining a 3D seismic image based, at least in part, on a combination of the seismic partial image for each seismic subset.

In general, in one aspect, embodiments relate to a system for forming three-dimensional ("3D") seismic image of a subterranean region of interest including a seismic acquisition system, and a seismic processor configured to receive a seismic dataset from the seismic acquisition system, wherein the seismic dataset includes a plurality of source locations, a plurality of receiver locations, and a seismic trace for each pair of one source location and one receiver location, receive a 3D travel-time cube for each source location and each receiver location, and divide the seismic dataset into a plurality of seismic subsets, each subset comprising: a first set of source locations; a second set of receiver locations; the seismic trace for each pair of one source location from the first set and one receiver location from the second set; and the 3D travel-time cube for each source in the first set and 3D travel-time cube for each source in the second set, wherein a first size of the first set and a second size of the second set differ by less than fifty percent of an average of the first size and the second size; for each seismic subset; transmit, to a random-access memory block of a computer processing unit ("CPU"), the seismic subset; form, using the CPU, a seismic partial image based, at least in part, on the seismic subset; and determine the 3D seismic image based, at least in part, on a combination of the seismic partial image for each seismic subset.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein provide methods and systems for efficiently implementing three-dimensional (3D) pre-stack seismic imaging of a subterranean region by organizing the flow of data in an advantageous manner and subsequently drilling a well to produce hydrocarbons based upon the seismic image. In particular embodiments are provided for performing 3D pre-stack Kirchhoff migration on a computer processor including a plurality of GPUs attached to each of a plurality of CPUs. Embodiments are provided to overcome a primary computation constraint namely the loading into the CPU of two travel time cubes for each seismic trace processed.

Figure 1:
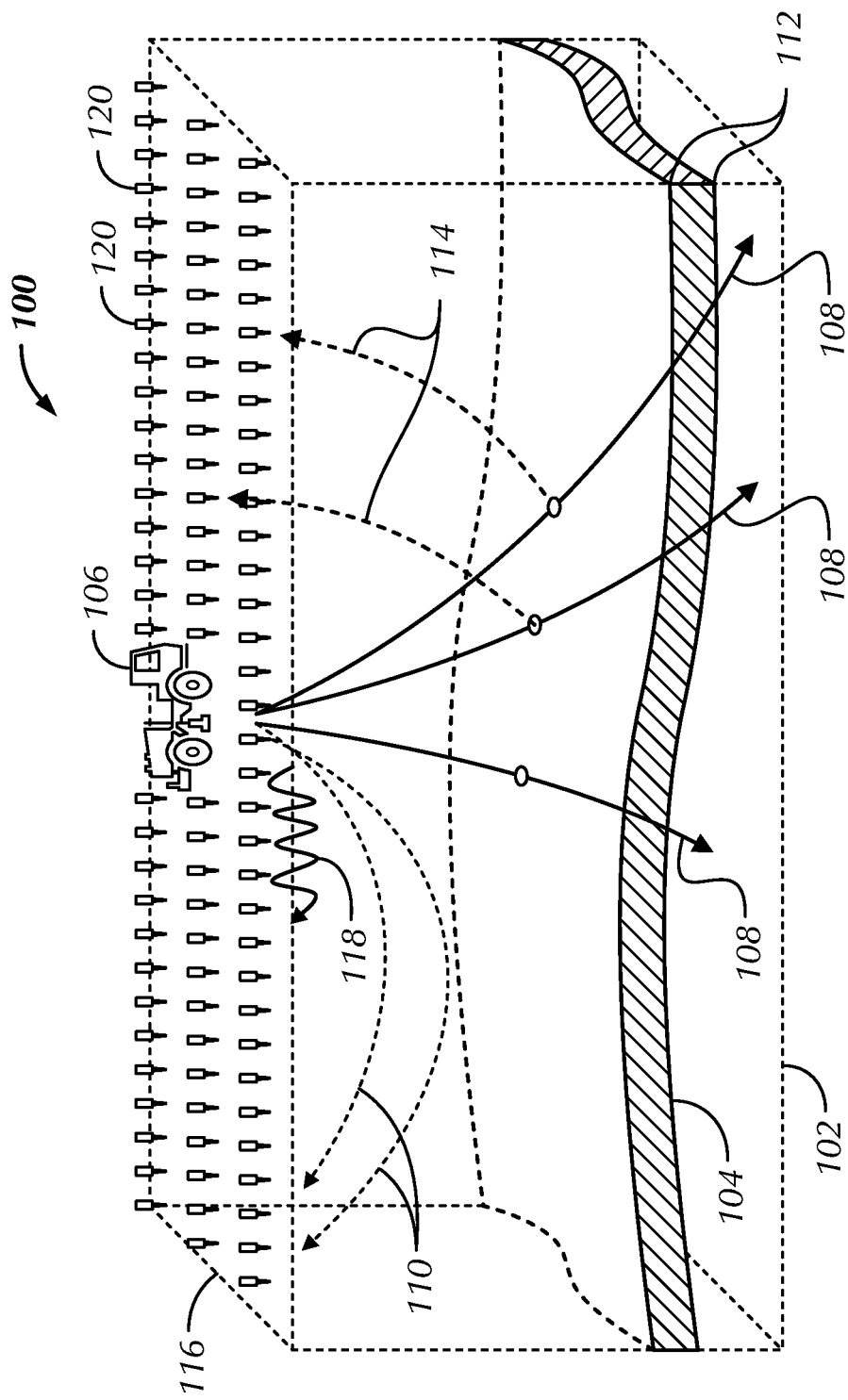
FIG. 1 depicts a seismic survey in accordance with one or more embodiments.

FIG. 1 shows a seismic survey (100) of a subterranean region of interest (102), which may contain a hydrocarbon reservoir (104). In some cases, the subterranean region of interest (102) may lie beneath a lake, sea, or ocean. In other cases, the subterranean region of interest (102) may lie beneath an area of dry land. The seismic survey (100) may utilize a seismic source (106) that generates radiated seismic waves (108). The type of seismic source (106) may depend on the environment in which it is used, for example on land the seismic source (106) may be a vibroseis truck or an explosive charge, but in water the seismic source (106) may be an airgun. The radiated seismic waves (108) may return to the surface of the Earth (116) as refracted seismic waves (110) or may be reflected by geological discontinuities (112) and return to the surface as reflected seismic waves (114). The radiated seismic waves may propagate along the surface as Rayleigh waves or Love waves, collectively known as "ground-roll" (118). Vibrations associated with ground-roll (118) do not penetrate far beneath the surface of Earth (116) and hence are not influenced, nor contain information about, portions of the subterranean region of interest (102) where hydrocarbon reservoirs (104) are typically located. Seismic receivers (120), located on or near the surface of Earth (116), detect reflected seismic waves (114), refracted seismic waves (110) and ground-roll (118).

In accordance with one or more embodiments, the refracted seismic waves (110), reflected seismic waves (114), and ground-roll (118) generated by a single activation of the seismic source (106) are recorded by a seismic receiver (120) as a time-series representing the amplitude of ground-motion at a sequence of discreet sample times. Usually the origin of the time-series, denoted t=0, is determined by the activation time of the seismic source (106). This time-series may be denoted a seismic "trace". The seismic receivers (120) are positioned at a plurality of seismic receiver locations which we may denote $(x_r, y_r)$ where x and y represent orthogonal axes on the surface of Earth (116) above the subterranean region of interest (102). Thus, the plurality of seismic traces generated by activations of the seismic source (106) at a single location may be represented as a three-dimensional "3D" volume with axes $(x_r, y_r, t)$ where $(x_r, y_r)$ represents the location of the seismic receiver (120) and t denotes the time sample at which the amplitude of ground-motion was measured.

However, a seismic survey (100) may include recordings of seismic waves generated by a seismic source (106) sequentially activated at a plurality of source locations denoted $(x_s, y_s)$. In some cases, this may be achieved using a single seismic source (106) that is moved to a new location between activations. In other cases, a plurality of seismic sources (106) positioned at different locations may be used. Irrespective of how they are acquired, all the seismic traces acquired by a seismic survey (100) may be represented as a five-dimensional volume, with coordinate axes $(x_s, y_s, x_r, y_r, t)$, and called a "seismic dataset".

Figure 2:
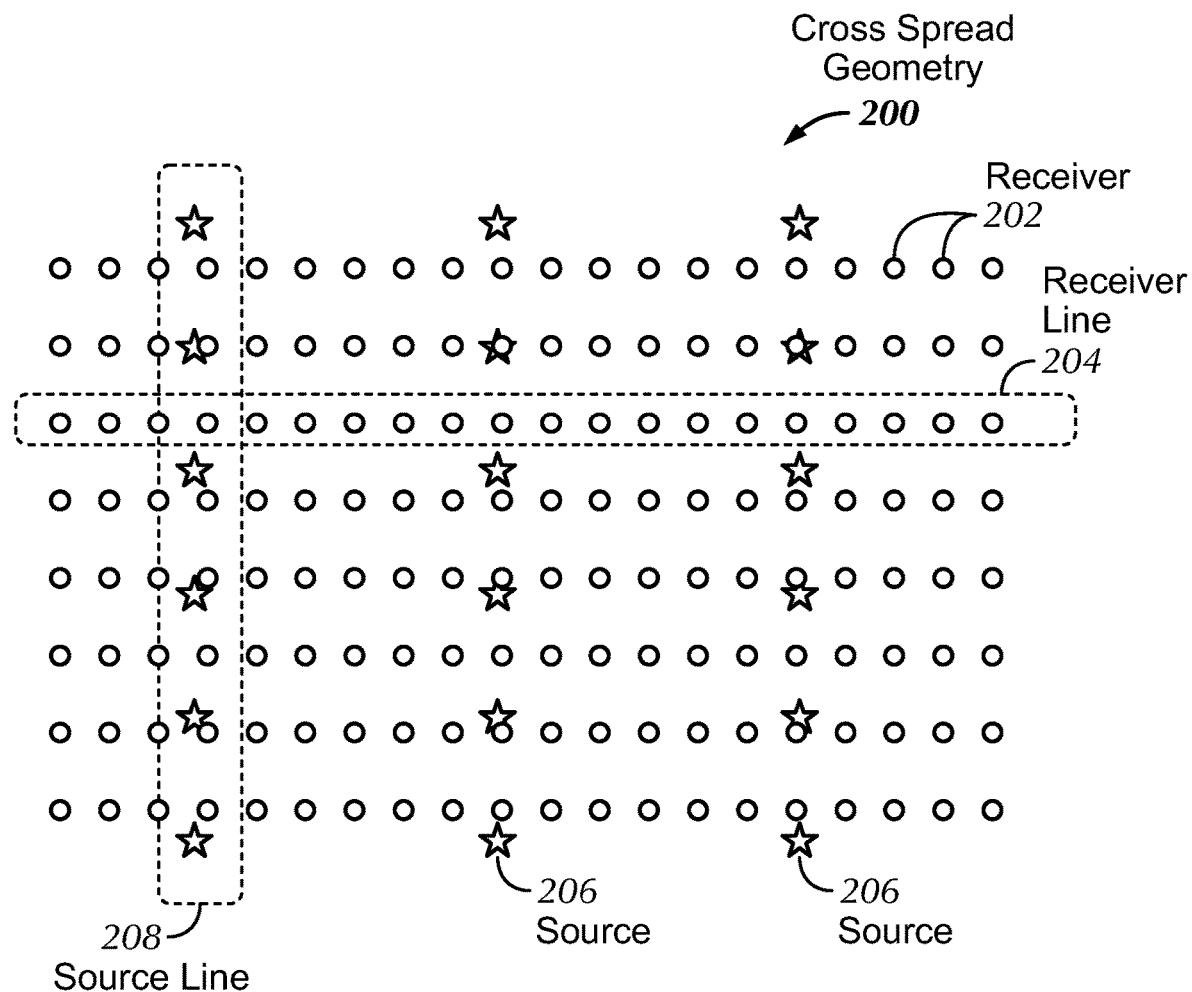
FIG. 2 shows an acquisition geometry system in accordance with one or more embodiments.

FIG. 2 shows a cross-spread acquisition geometry (200) in accordance with one or more embodiments. The cross-spread geometry (200) includes a plurality of source locations (220) on each of a plurality of source lines (208*a*, 208*b*) and a plurality of receiver locations (220) on each of a plurality of receiver lines (204). Typically, a seismic source (106) may occupy source locations (206) in turn. At each source location (206) the seismic source (106) may be activated (i.e., fired) at least once to emit seismic waves (108). The seismic waves (108) emitted by each firing of the seismic source (106) may be detected and recorded by tens of thousands, or hundreds of thousands of receivers (120) each positioned at a distinct receiver location (220). In some cases, more than one seismic source (106) may be used to efficiently emit seismic waves from every source location (206). For example, a first seismic source (106) may occupy and emit seismic waves from each source locations (206) along a first source line (208*a*) in turn, while a second seismic source (106) may occupy and emit seismic waves from each source locations (206) along a second source line (208*b*) in turn.

Typically, the spacing of source locations (206) along a source line (208*a*, 208*b*) is smaller than the spacing of receiver locations (220) along a receiver line (204). Further, the spacing of source locations (206) along a source line (208) are less than the spacing between adjacent source lines (208*a*, 208*b*). Similarly, the spacing of receiver locations (220) along a receiver line (204) are typically smaller than the spacing between adjacent receiver lines (208*a*, 208*b*). However, in other cases these relationships between spacings may be different and these typical relationships between spacing should not be interpreted as limiting the scope of the claimed invention.

In a cross-spread geometry (200) each source line (208*a*, 208*b*) may cross each receiver line (204) approximately perpendicularly. In practice the angle between the source lines (208*a*, 208*b*) and the receiver lines (204) may deviate from 90 degrees due to logistical and access constraints.

Figure 3:
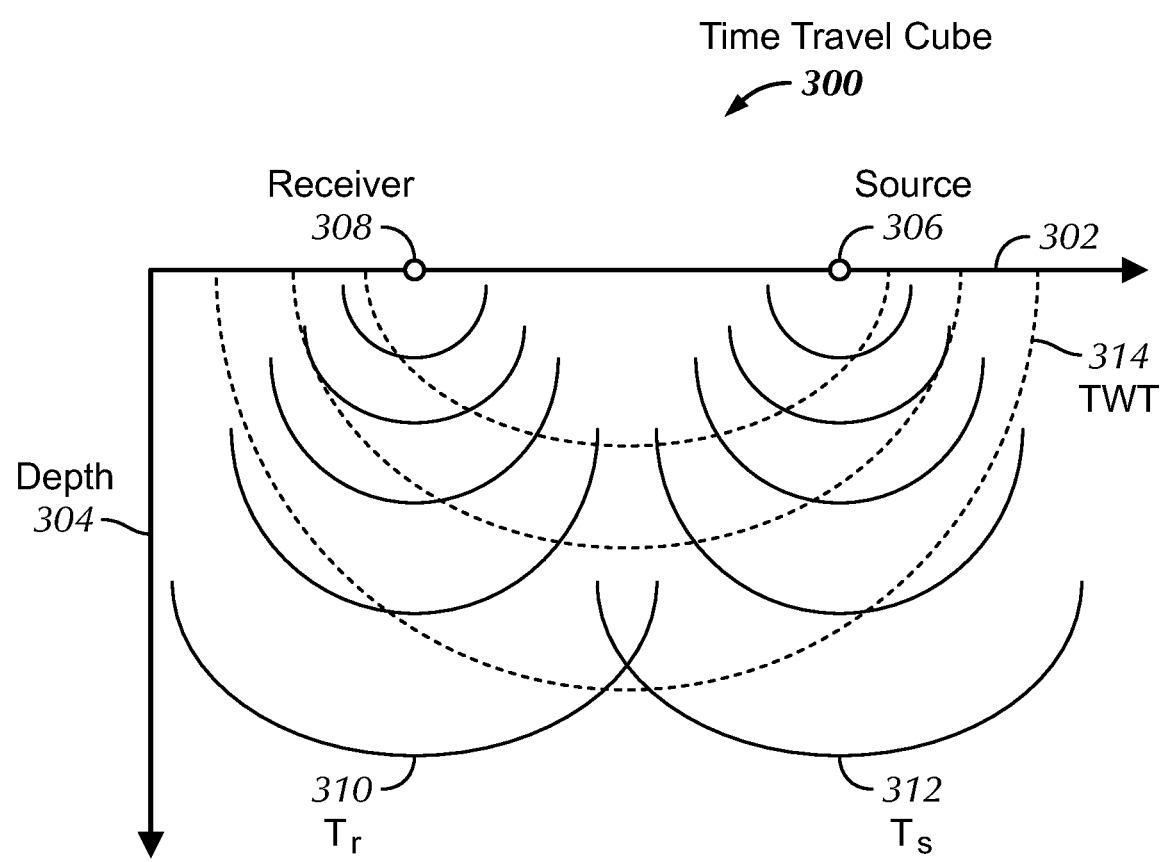
FIG. 3 shows a 3D travel time cube in accordance with one or more embodiments.

FIG. 3 shows isochrons of a two-dimensional ("2D") section through a three-dimensional ("3D") receiver travel time cube (308), a source travel time cube (306), and two-way travel time cube (310), in accordance with one or more embodiments. Although the term "cube" is frequently used by one or ordinary skill in the art, each 3D travel time cube may have orthogonal dimensions of different sizes and may have different sampling intervals along each dimension. Further the sampling interval may vary in size at different points along one or more of the dimensions.

The horizontal axis (302) represents position on the surface of the earth (116). The vertical axis (304) represents depth below the surface of the Earth (116). An example source location (206) and an example receiver location (220) are depicted on the surface of the Earth (116). The solid lines represent isochrons (312) of the receiver travel time cube, $T_r(x,y,z)$, and the dotted lines represent isochrons (314) of the source travel time cube, $T_s(x,y,z)$. The dashed lines represent isochrons (316) of the two-way travel time cube, $TWT(x,y,z)$, that may be given by:

$$TWT(x,y,z) = T_r(x,y,z) + T_s(x,y,z) \qquad \text{Equation (1)}$$

A two-way travel time cube (306), $TWT(x,y,z)$, for a source location (206) and a receiver location (220), represents the predicted travel time taken for a seismic wave to propagated from the source location (206) to a position $(x,y,z)$ in the subsurface from the position $TWT(x,y,z)$ to the receiver location (220). The two-way travel time cube is invariant with respect to switching the receiver location (220) to the source location (206) and the source location (106) to the receiver location (220). The source travel time cube (306) may be determined from a seismic velocity model, that specifies the seismic propagation velocity at, at least, a sampling of points within the subsurface, by solving an eikonal equation for a source location (206). Similarly, the receiver travel time cube (308) may be determined from the seismic velocity model and a receiver location (220). Frequently, both the seismic velocity model and a 3D travel time cube will be defined on a grid of position points representing the subsurface.

Figure 4:
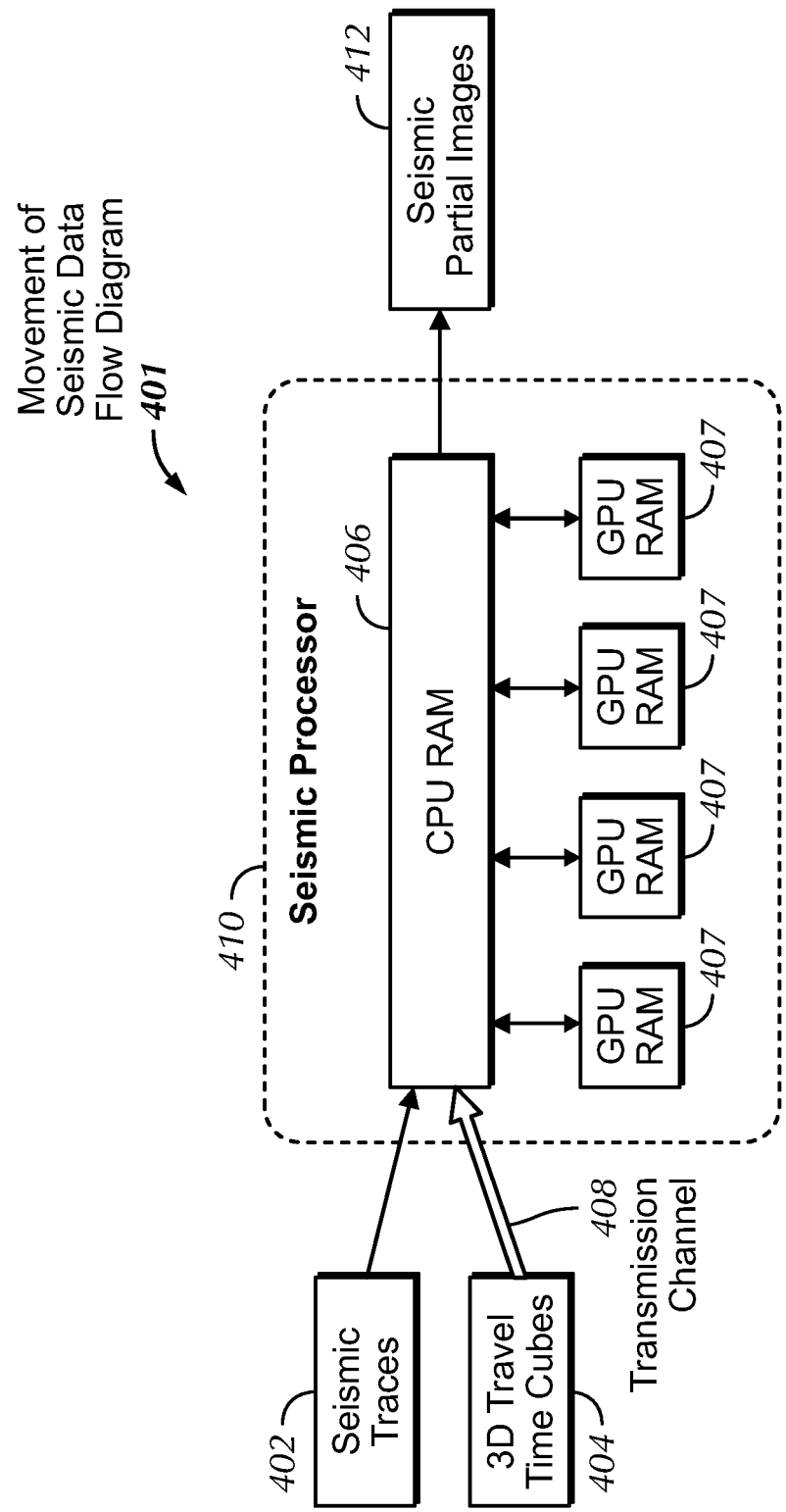
FIG. 4 shows data flow for a seismic processing method in accordance with one or more embodiments
Figure 8:
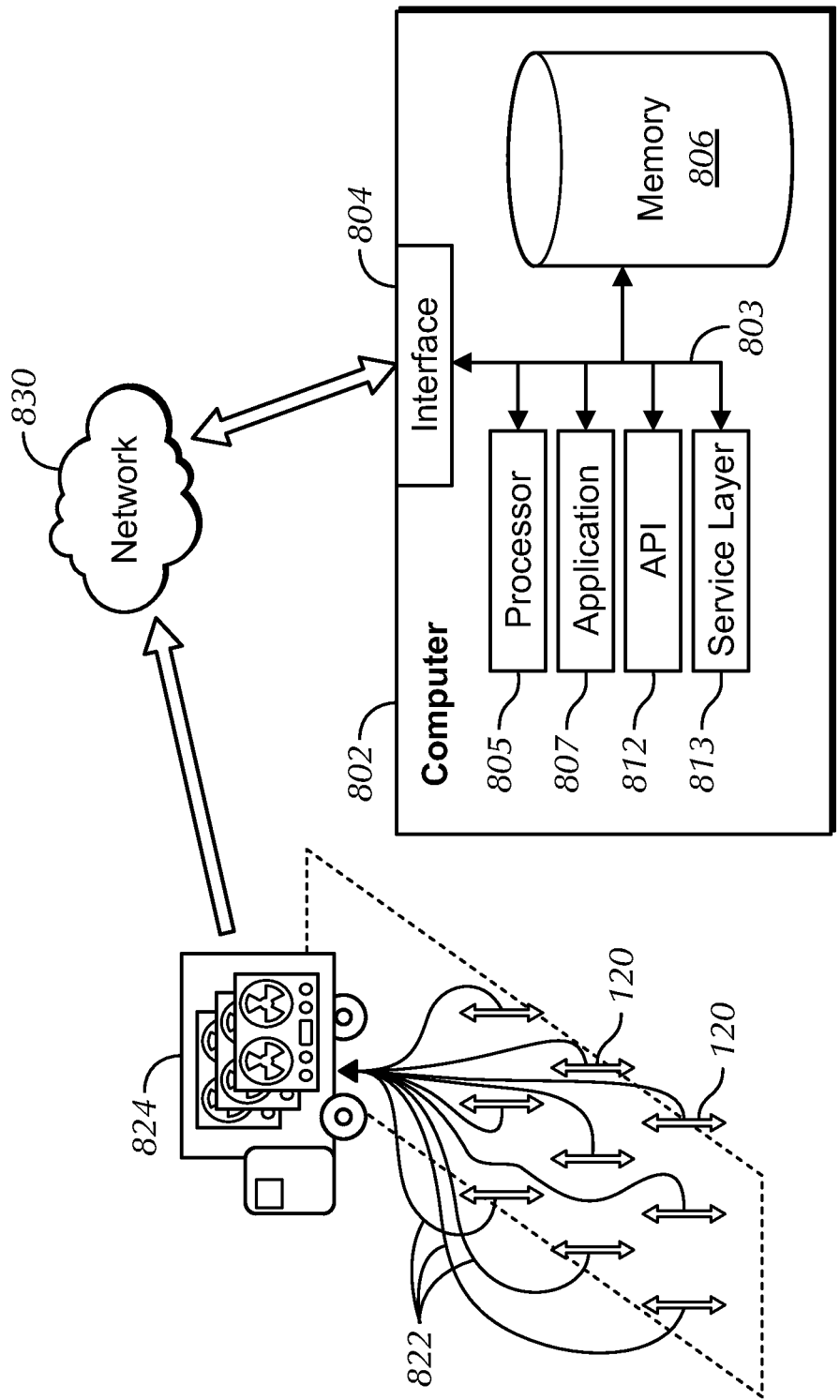
FIG. 8 shows an example application in accordance with one or more embodiments.

FIG. 4 depicts a flow diagram (401) showing the movement of seismic data through a seismic processor, in accordance with one or more embodiments. The seismic processor (410) may form a 3D seismic image or a seismic partial image (412). In particular, the seismic processor (410) may perform a seismic migration that may be a Kirchhoff migration. In accordance with one or more embodiments, the seismic processor (410) may be a computing device, such as a computer system as shown in FIG. 8 below. The computer system may include one or more central processing units ("CPUs") (406). Furthermore, the computer system may include a plurality of graphical processing units ("GPUs") (407) that may be attached to the one or more CPUs (406). The GPUs (407) may receiver input from, and send output to, the CPU (406) to which they are attached.

The seismic processing algorithm requires a plurality of seismic traces, together with a source travel time cube and a receiver travel time cube for each trace to generate a seismic partial image (412). Typically, there are millions of seismic traces in a seismic dataset and the finite size of a seismic processor requires the seismic dataset be divided into subsets that are sequentially processed by the seismic processor.

The computer memory required for a trace is typically at least an order of magnitude smaller than computer memory required for a 3D travel time cube. Thus, in conventional implementations the transmission of 3D travel time cubes (404) from long term computer memory over a transmission channel (408) to the CPU (406) takes at least an order of magnitude longer than the transmission of the corresponding seismic traces (402). Conventional methods may load a seismic data subset composed of traces and 3D travel time cubes for one source and many receivers. For example, 101 traces corresponding to one source and 100 receivers requires 101 3D travel time cubes, one for the source and one for each receiver. Similarly, 100 traces corresponding to one receiver and 100 sources requires 101 3D travel time cubes, one for the receiver and one for each source.

Since loading the 3D travel time cubes is the bottleneck, taking at least ten times as long as loading the trace, maximizing the number of traces processed per 3D travel time cube loaded is beneficial.

In accordance with one or more embodiment, the seismic data subsets may be determined with approximately equal numbers of sources and receivers and the traces corresponding to these sources and receivers. In some embodiments, the number of source and the number of receivers may be exactly equal. In other embodiments the number of sources and the number of receivers may be similar. For example, in some embodiments the difference between the number of sources and the number of receivers may be less than the mean of the number of sources and the number of receivers.

Figure 5:
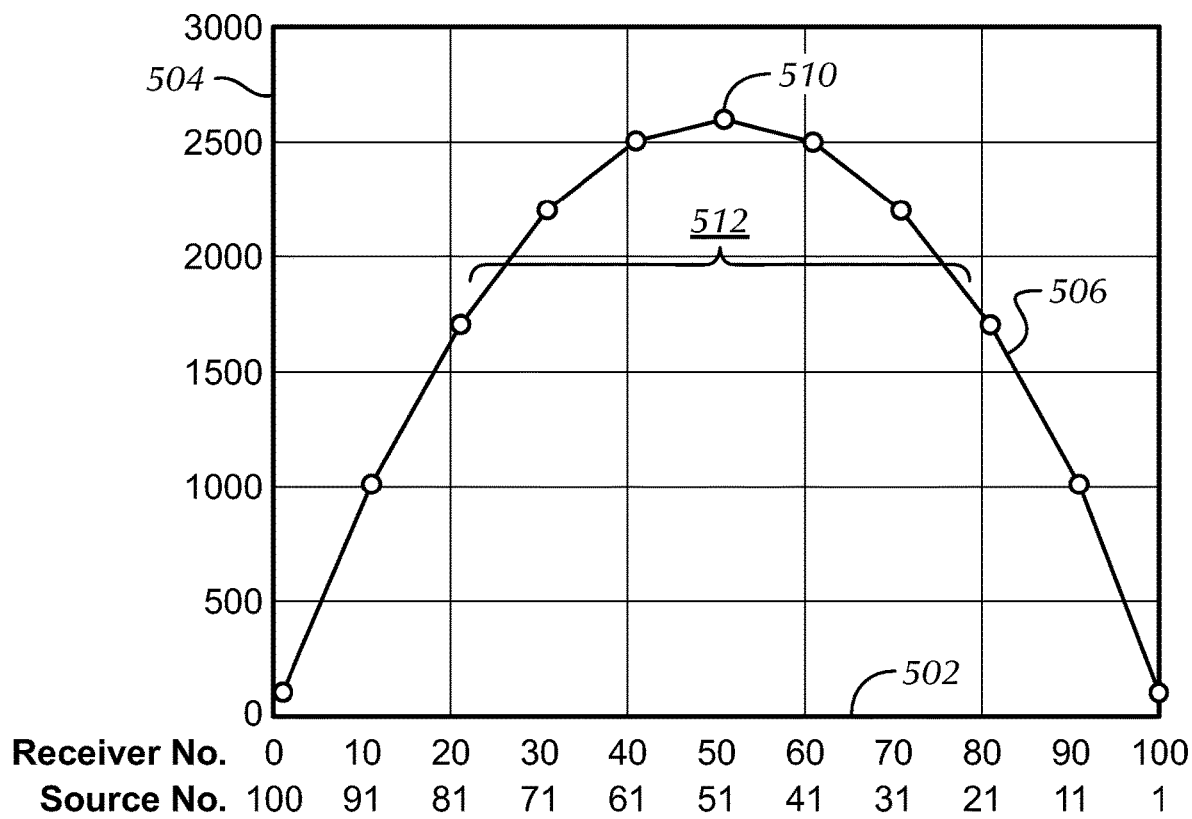
FIG. 5 shows a flowchart in accordance with one or more embodiments.

The solid curve (506) in FIG. 5 shows the number of traces that may be processed by a seismic processor (410) assuming 100 seismic traces (402) and their corresponding source travel time cubes (306) and receiver travel time cubes (308) are loaded into the seismic processor (410). The x-axis (502) indicate both the number of receiver travel time cubes (308) and the number of sources travel time cubes (306). The number of receiver travel time cubes increases from the left to the right of the x-axis (502). The number of source travel time cubes increases from the right to the left of the x-axis (502). The sum of number of source travel time cubes (306) and receiver travel time cubes (308) is constant, and equal to 101, everywhere on the x-axis (502). The y-axis (504) indicates the number of traces that can be processed.

For example, if only one source travel time cube (306) and the 100 receiver travel time cubes (308) are loaded 100 traces may be processed. Similarly, if only one receiver travel time cube (308) and the 100 source travel time cubes (306) are loaded 100 traces may be processed. These extremes represent the worst cases. However, if 50 receiver travel time cube (308) and the 51 source travel time cubes (306) are loaded, 2550 traces may be processed. This value for the maximum number of traces that may be processed corresponds to the peak value (510) of the curve (506). Although the peak value (510) represents the largest number of traces that may be processed in this example, a person of ordinary skill in the art will appreciate that a significant improvement in the number of traces that may be processed over the worst case may be achieved whenever the number of source travel time cubes (306) and the number of receiver travel time cubes (308) loaded is similar. For example, within the range (512) where the difference between the number of source travel time cubes (306) and receiver travel time cubes (308) is less than the mean of the number of source travel time cubes (306) and the number of receiver travel time cubes (308), the number of traces that may be processed is at least 19.5 times greater than the worst case.

Figure 6:
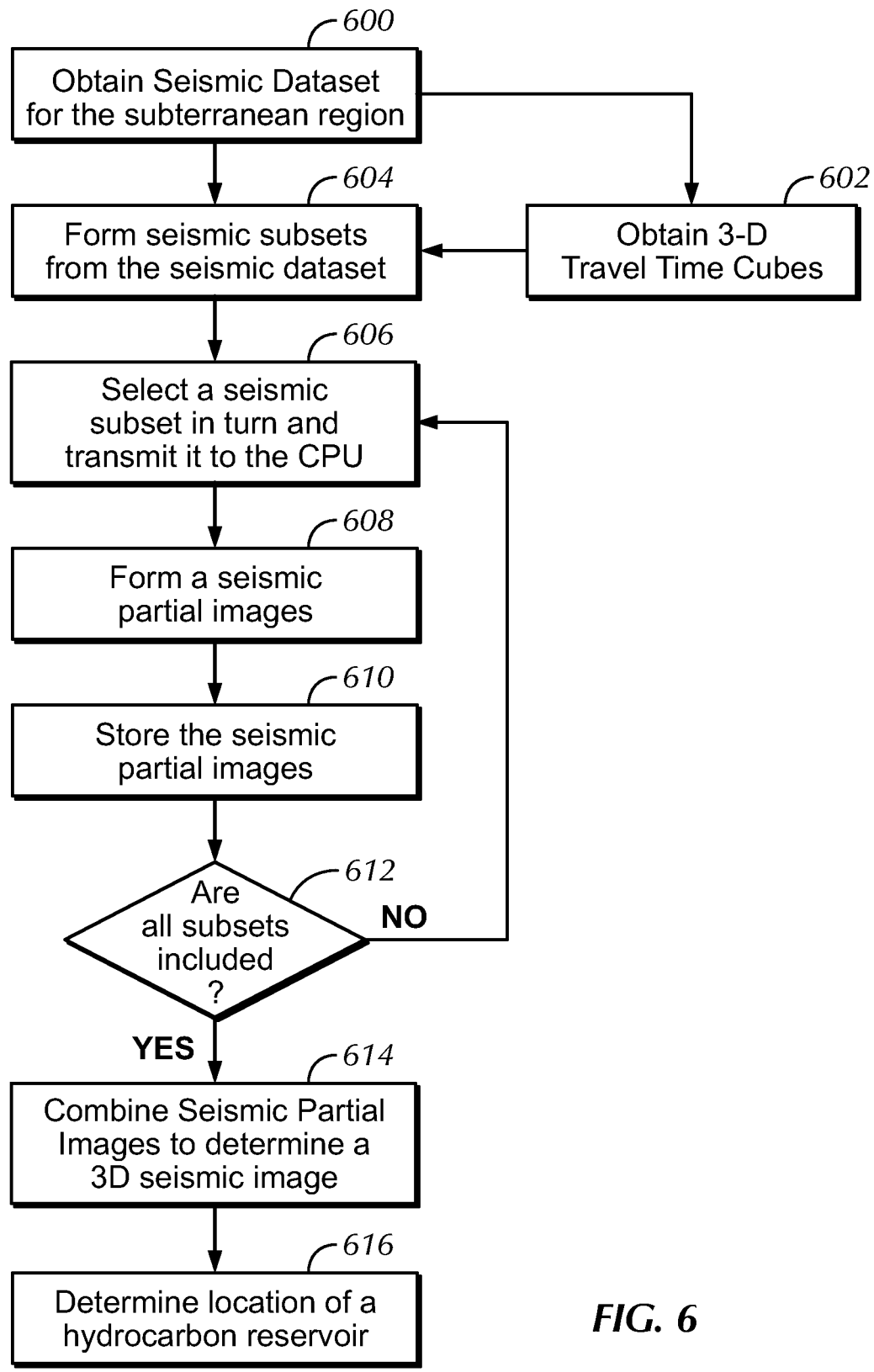
FIG. 6 shows a flowchart in accordance with one or more embodiments.

FIG. 6 shows a flowchart in accordance with one or more embodiments. Specifically, the flowchart illustrates a method for conducting a Kirchhoff migration efficiently.

Further, one or more blocks in FIG. 6 may be performed by one or more components as described in FIGS. 1-5. While the various blocks in FIG. 6 are presented and described sequentially, one of ordinary skill in the art will appreciate that some or all the blocks may be executed in different orders, may be combined or omitted, and some or all of the blocks may be executed in parallel. Furthermore, the blocks may be performed actively or passively. In Step 600 a seismic dataset for a subterranean region of interested (102) may be acquired. The seismic dataset may be acquired using a cross-spread geometry.

In Step 602, a plurality of 3D travel time cubes may be obtained. They may be obtained based on the seismic dataset using any seismic velocity analysis and travel time computation methods known to a person of ordinary skill in the art without departing from the scope of the invention. For example, velocity analysis may be performed using normal moveout, dip moveout, pre-stack migration velocity analysis, tomography, and full waveform inversion, individually or in combination. Travel times may be computed, for example, from the velocity model determined using velocity analysis using ray tracing or using a finite difference solution to the eikonal equation.

In Step 604, a plurality of seismic subsets may be determined from the seismic dataset. The seismic subsets may contain a plurality of seismic traces, a plurality of source travel time cubes (306) and a plurality of 3D travel time cubes. The number of source travel time cubes (306) may be similar to the number of receiver travel time cubes (308). In one or more embodiments, the number of source travel time cubes (306) may be equal to the number of receiver travel time cubes (308).

In Step 606, a seismic subset may be selected from the plurality of seismic subsets and transmitted to the CPU. The first seismic subset may be selected at random or may be selected based on its geographic position within the seismic survey, e.g., at the center, or at one corner. Alternatively, the first seismic survey may be selected based on the order in which the seismic sources were activated. Thereafter, subsequent seismic subsets may be selected in a random or pseudo-random manner. Alternatively, subsequent seismic subsets may be selected to be spatially adjacent to the previously selected seismic subset, or as the seismic subset containing the earliest acquired seismic recordings. Further, the seismic subsets may be selected in any way a person of ordinary skill in the art finds convenient, without departing from the scope of the invention.

A seismic subset may be a certain amount of traces at an associated source travel time cube (306) and receiver travel time cube (308). The subsets divide the dataset into hundreds of thousands of subsets. Subsets may include the data traces. As mentioned in FIG. 4, the 3D travel time cubes that go with traces are quite a bit larger. One 3D travel time cube may be needed per source (206) and a subset could include a few hundred traces and the associated 3D travel time cubes for those traces.

In Step 608, in accordance with some embodiments, a seismic partial image may be formed using one or more CPUs. In other embodiments, the seismic partial image may be formed using one or more CPUs each attached to an array of GPUs. In accordance with one or more embodiments the seismic partial image may be determined using pre-stack Kirchhoff migration. The Kirchhoff migrated 3D seismic image may be a Kirchhoff time migration image, or a Kirchhoff depth migrated image. The seismic partial image may be a spatially limited portion of a Kirchhoff migrated image, or the seismic partial image may be a pre-stack image gather, such as a common midpoint gather, common image point gather, common offset gather, or common azimuth gather.

In Step 610, the seismic partial images may be stored. Storage may be in any type of memory architecture having the capability to store the seismic partial images without departing from the scope of the invention. In some embodiments, the seismic partial image may be a portion of a Kirchhoff migrated stacked seismic image delimited by a geographical boundary. In other embodiments, the seismic partial image may be a contribution from a subset of seismic source locations (206) and a subset of seismic receiver locations (220) to a portion of a Kirchhoff migrated stacked seismic image delimited by a geographical boundary. In still other embodiments the seismic partial image may be a seismic gather, such as a common image gather of Kirchhoff migrated seismic data. In accordance with some embodiments, the seismic partial images may be stored separately until all seismic partial images are completed and ready for combination. In accordance with other embodiments, the seismic partial images may be combined in a stacked seismic partial image that is updated as each new seismic partial image is completed.

In Step 612, it may be determined if all the seismic subsets have been processed. If all the seismic subsets have been processed, then all the traces in the seismic dataset will have been processed. If all the seismic subsets have been processed the workflow may progress to Step 614. If unprocessed seismic subsets remain, then the next seismic subset may be selected in Step 606.

In Step 614, the seismic partial images may be combined to determine a 3D seismic image. Once the partial images are outputted from the seismic subsets (612), the partial images are combined to generate the final image (614). The final 3D seismic image may be a 3D seismic image from combining the seismic partial images stored in step 610. This final 3D seismic image may be used in step 616 to determine the location of a hydrocarbon reservoir and to plan one or more wellbore paths.

Figure 7:
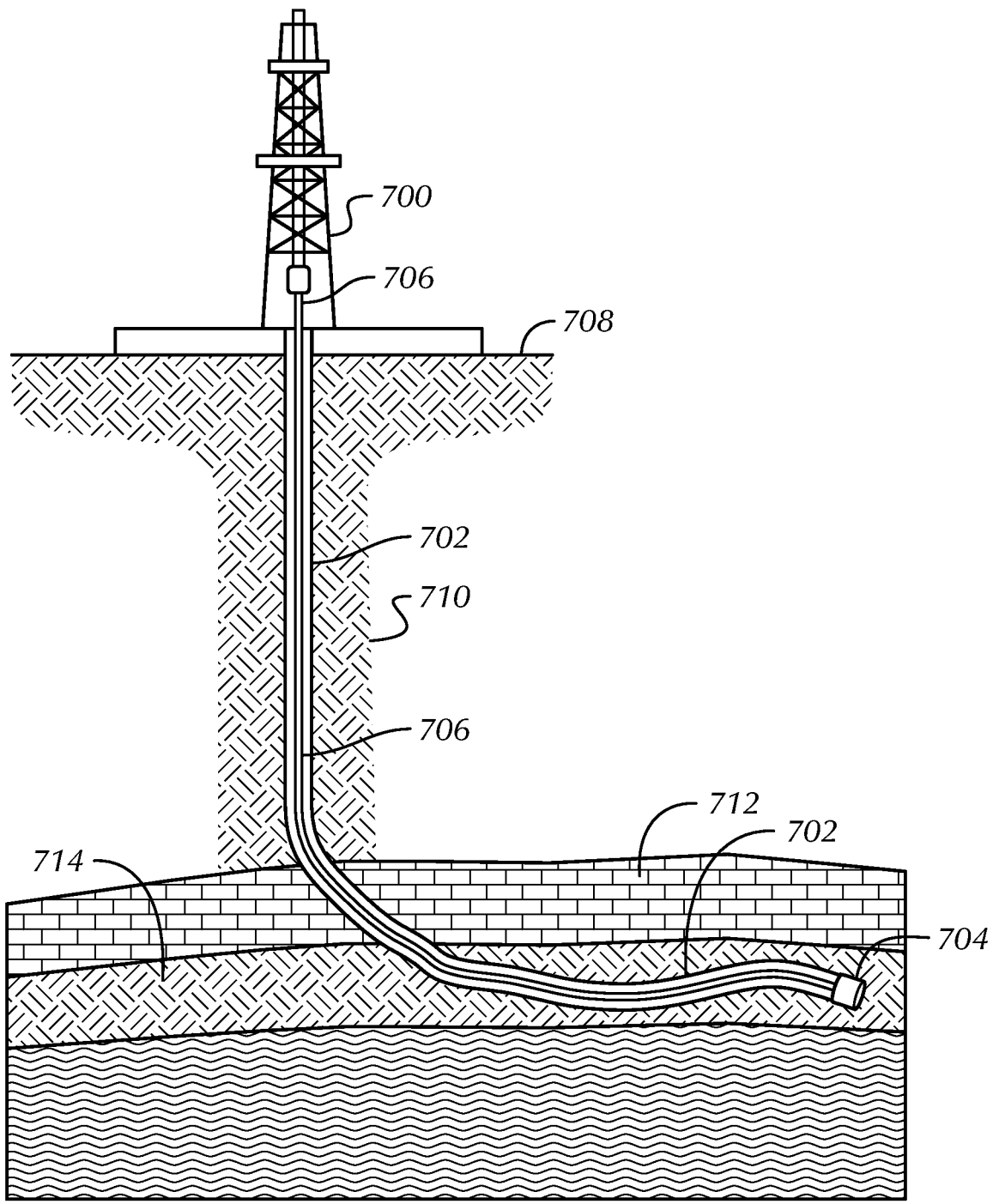
FIG. 7 shows a drilled wellbore schematic in accordance with one or more embodiments.

FIG. 7 illustrates systems in accordance with one or more embodiments. As shown in FIG. 7, a well (702) may be drilled by a drill bit (704) attached by a drillstring (706) to a drill rig (708) located on the surface of the Earth (116). The well may traverse a plurality of overburden layers (710) and one or more cap-rock layers (712) to a hydrocarbon reservoir (714). The well path (702) may be planned and drilled based, at least in part, on the 3D seismic image of a subterranean region of interest. In some embodiments, the well path (702) may be a straight well path and in other embodiments, the well path may be a curved well path.

FIG. 8 shows a seismic recording and processing system, in accordance with one or more embodiments. The data recorded by a plurality of seismic receivers (120) may be transmitted to a seismic recording facility (824) located in the neighborhood of the seismic survey (100). The seismic recording facility may be one or more seismic recording trucks (824). The plurality of seismic receivers (120) may be in digitally or analogic telecommunication with the seismic recording facility (824). The telecommunication may be performed over telemetry channels (822) that may be electrical cables, such as coaxial cables, or may be performed wireless using wireless systems, such as Wi-Fi or Bluetooth. Digitization of the seismic data may be performed at each seismic receiver (120), or at the seismic recording facility (824), or at an intermediate telemetry node (not shown) between the seismic receiver (120) and the seismic recording facility (824).

The seismic data may be recorded at the seismic recording facility (824) and stored on non-transitory computer memory. The computer memory may be one or more computer hard-drives, or one or more computer memory tapes, or any other convenient computer memory media familiar to one skilled in the art. The seismic data may be transmitted to a computer (802) for processing. The computer (802) may be located in or near the seismic recording facility (824) or may be located at a remote location, that may be in another city, country, or continent. The seismic data may be transmitted from the seismic recording facility (824) to a computer (802) for processing. The transmission may occur over a network (830) that may be a local area network using an ethernet or Wi-Fi system, or alternatively the network (830) may be a wide area network using an internet or intranet service. Alternatively, seismic data may be transmitted over a network (830) using satellite communication networks. Most commonly, because of its size, seismic data may be transmitted by physically transporting the computer memory, such as computer tapes or hard drives, in which the seismic data is stored from the seismic recording facility (802) to the location of the computer (802) to be used for processing.

FIG. 8 further depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (912) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804 includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of forming a three-dimensional ("3D") seismic image of a subterranean region of interest, comprising:
   obtaining a seismic dataset for the subterranean region of interest, wherein the seismic dataset comprises a plurality of source locations, a plurality of receiver locations, and a seismic trace for each pair of one source location and one receiver location;
   obtaining a 3D travel-time cube for each source location and each receiver location;
   dividing the seismic dataset into a plurality of seismic subsets, each subset comprising:
   a first set of source locations;
   a second set of receiver locations;
   the seismic trace for each pair of one source location from the first set and one receiver location from the second set; and
   the 3D travel-time cube for each source in the first set and 3D travel-time cube for each source in the second set,
   wherein a first size of the first set and a second size of the second set differ by less than fifty percent of a sum of the first size and the second size;
   for each seismic subset;
   transmitting, to a random-access memory block of a computer processing unit ("CPU"), the seismic subset; and
   forming, using the CPU, a seismic partial image based, at least in part, on the seismic subset, and
   determining the 3D seismic image based, at least in part, on a combination of the seismic partial image for each seismic subset.

2. The method of claim 1, further comprising:
   identifying a portion of the subterranean region of interest with a likelihood of containing hydrocarbons based, at least in part, on the 3D seismic image of the subterranean region of interest;
   determining a well path through the subterranean region of interest based, at least in part, on the identified portion of the subterranean region of interest; and
   performing the well path using a drilling system.

3. The method of claim 1, wherein the first size is equal to the second size.

4. The method of claim 1, wherein the CPU comprises:
   the CPU; and
   at least one graphical processing unit.

5. The method of claim 1, wherein the 3D seismic image comprises a seismic partial image generated by a Kirchhoff migration.

6. The method of claim 5, wherein the seismic partial image comprises a common image gather.

7. The method of claim 1, wherein the seismic dataset is acquired by utilizing a cross-spread acquisition geometry.

8. A non-transitory computer readable medium storing instructions executable by a computer processor, the instructions comprising functionality for:
   receiving a seismic dataset for a subterranean region of interest, wherein the seismic dataset comprises a plurality of source locations, a plurality of receiver locations, and a seismic trace for each pair of one source location and one receiver location;
   receiving a 3D travel-time cube for each source location and each receiver location;
   dividing the seismic dataset into a plurality of seismic subsets, each subset comprising:
   a first set of source locations;
   a second set of receiver locations;
   the seismic trace for each pair of one source location from the first set and one receiver location from the second set; and
   the 3D travel-time cube for each source in the first set and 3D travel-time cube for each source in the second set,
   wherein a first size of the first set and a second size of the second set differ by less than fifty percent of an average of the first size and the second size;
   for each seismic subset;
   transmitting, to a random-access memory block of a computer processing unit ("CPU"), the seismic subset; and
   forming, using the CPU, a seismic partial image based, at least in part, on the seismic subset,
   determining a 3D seismic image based, at least in part, on a combination of the seismic partial image for each seismic subset.

9. The non-transitory computer readable medium of claim 8, the instructions further comprising:

identifying a portion of the subterranean region of interest with a high likelihood of containing hydrocarbons based, at least in part, on the 3D seismic image of the subterranean region of interest; and determining a well path through the subterranean region of interest based, at least in part, on the identified portion of the subterranean region of interest.

10. The non-transitory computer readable medium of claim 8, wherein the first size is equal to the second size.

11. The non-transitory computer readable medium of claim 8, wherein the CPU comprises:
the CPU; and
at least one graphical processing unit.

12. The non-transitory computer readable medium of claim 8, wherein the 3D seismic image comprises a seismic partial image generated by a Kirchhoff migration.

13. The non-transitory computer readable medium of claim 12, wherein the seismic partial image comprises a common image gather.

14. The non-transitory computer readable medium of claim 8, wherein the seismic dataset is acquired by utilizing a cross-spread acquisition geometry.

15. A system for forming three-dimensional ("3D") seismic image of a subterranean region of interest, comprising:
a seismic acquisition system; and
a seismic processor configured to:
receive a seismic dataset from the seismic acquisition system, wherein the seismic dataset comprises a plurality of source locations, a plurality of receiver locations, and a seismic trace for each pair of one source location and one receiver location;
receive a 3D travel-time cube for each source location and each receiver location;
divide the seismic dataset into a plurality of seismic subsets, each subset comprising:
a first set of source locations;
a second set of receiver locations;
the seismic trace for each pair of one source location from the first set and one receiver location from the second set; and
the 3D travel-time cube for each source in the first set and 3D travel-time cube for each source in the second set,
wherein a first size of the first set and a second size of the second set differ by less than fifty percent of an average of the first size and the second size;
for each seismic subset;
transmit, to a random-access memory block of a computer processing unit ("CPU"), the seismic subset;
form, using the CPU, a seismic partial image based, at least in part, on the seismic subset; and
determine the 3D seismic image based, at least in part, on a combination of the seismic partial image for each seismic subset.

16. The system of claim 15, wherein forming an objective function comprises:
identify a portion of the subterranean region of interest with a high likelihood of containing hydrocarbons based, at least in part, on the 3D seismic image of the subterranean region of interest; and
determine a well path through the subterranean region of interest based, at least in part, on the identified portion of the subterranean region of interest.

17. The system of claim 15, wherein forming the plurality of trace pairs comprises:
the first size is equal to the second size.

18. The system of claim 15, wherein the CPU comprises:
the CPU comprises the CPU and at least one graphical processing unit.

19. The system of claim 15, wherein the 3D seismic image comprises a seismic partial image generated by a Kirchhoff migration.

20. The system of claim 15, wherein the seismic partial image comprises a common image gather.

* * * * *